(12) United States Patent
Pal et al.

(10) Patent No.: US 9,505,256 B2
(45) Date of Patent: Nov. 29, 2016

(54) COATED MEDIA SUBSTRATE

(75) Inventors: Lokendra Pal, San Diego, CA (US);
Xulong Fu, San Diego, CA (US);
Xiaoqi Zhou, San Diego, CA (US);
Ronald J. Selensky, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/366,197

(22) PCT Filed: Dec. 20, 2011

(86) PCT No.: PCT/US2011/066117
§ 371 (c)(1),
(2), (4) Date: Jun. 17, 2014

(87) PCT Pub. No.: WO2013/095373
PCT Pub. Date: Jun. 27, 2013

(65) Prior Publication Data
US 2015/0035926 A1    Feb. 5, 2015

(51) Int. Cl.
*B41M 5/00* (2006.01)
*B41M 5/52* (2006.01)
(Continued)

(52) U.S. Cl.
CPC .............. *B41M 5/52* (2013.01); *B05D 3/0263* (2013.01); *B05D 3/0413* (2013.01); *B05D 5/04* (2013.01);
(Continued)

(58) Field of Classification Search
CPC .. B41M 5/5218; B41M 5/5254; B41M 5/52; B41M 5/508; B41M 5/5245; B41J 11/007; B41J 2/01; B01J 2523/10; B01J 2523/20; B01J 2523/30; C04B 41/0072; C04B 41/009

USPC ........... 428/32.28, 32.3, 32.31, 32.34, 32.38; 427/243; 347/101, 105
See application file for complete search history.

(56) References Cited

U.S. PATENT DOCUMENTS

| 5,928,787 A | 7/1999 | Owatari et al. |
| 6,350,507 B1 | 2/2002 | Iwamoto et al. |

(Continued)

FOREIGN PATENT DOCUMENTS

| CN | 1370687 | 9/2002 |
| CN | 1393346 | 1/2003 |

(Continued)

OTHER PUBLICATIONS

Lourenco et al., Printing Quality of Papers Coated with a Modified Pigment Obtained by in Situ Synthesis of Silica Film on PCC, XXI TECNICELPA Conference and Exhibition/VI CIADICYP 2010, Oct. 12-15, 2010, Lisbon, Portugal.

(Continued)

*Primary Examiner* — Betelhem Shewareged
(74) *Attorney, Agent, or Firm* — Thorpe, North & Western L.L.P.

(57) ABSTRACT

The present disclosure is drawn to coated media substrates, as well as related systems and methods. In one example, a coated media substrate for inkjet ink printing can comprise an ink-receiving layer coated on at least one side of a substrate, and can be formulated for accepting an inkjet ink composition. The ink-receiving layer can comprise an optical brightening agent, an organic acid salt, a binder, a pigment, and a low-molecular weight polymeric carrier having a weighted average molecular weight less than 50,000 Mw.

17 Claims, 2 Drawing Sheets

(51) Int. Cl.
*C04B 41/00* (2006.01)
*B41J 11/00* (2006.01)
*B41J 2/01* (2006.01)
*B41M 5/50* (2006.01)
*B05D 3/02* (2006.01)
*B05D 3/04* (2006.01)
*B05D 5/04* (2006.01)

(52) U.S. Cl.
CPC ............... *B41J 2/01* (2013.01); *B41J 11/007* (2013.01); *B41M 5/508* (2013.01); *C04B 41/009* (2013.01); *C04B 41/0072* (2013.01); *B01J 2523/10* (2013.01); *B01J 2523/20* (2013.01); *B01J 2523/30* (2013.01); *B41M 5/5218* (2013.01); *B41M 5/5227* (2013.01); *B41M 5/5245* (2013.01); *B41M 5/5254* (2013.01); *B41M 5/5272* (2013.01)

(56) References Cited

U.S. PATENT DOCUMENTS

| | | | |
|---|---|---|---|
| 6,485,609 B1 | 11/2002 | Boylan | |
| 6,652,092 B2 | 11/2003 | Sugiyama et al. | |
| 6,780,478 B2* | 8/2004 | Steiger et al. | 428/32.32 |
| 7,033,428 B2 | 4/2006 | Drummond | |
| 2002/0081419 A1* | 6/2002 | Purbrick et al. | 428/195 |
| 2002/0182380 A1 | 12/2002 | Nagashima et al. | |
| 2003/0008115 A1* | 1/2003 | Sugiyama et al. | 428/195 |
| 2004/0096598 A1 | 5/2004 | Kasamatsu et al. | |
| 2004/0253393 A1 | 12/2004 | Niu | |
| 2005/0003114 A1 | 1/2005 | Nakano | |
| 2005/0237372 A1 | 10/2005 | Kondo et al. | |
| 2007/0062653 A1 | 3/2007 | Duggirala et al. | |
| 2009/0317549 A1 | 12/2009 | Tan et al. | |
| 2010/0163195 A1* | 7/2010 | Dougherty | D21H 11/08 162/135 |
| 2010/0221460 A1 | 9/2010 | Wexler et al. | |
| 2015/0035926 A1* | 2/2015 | Pal et al. | 347/106 |

FOREIGN PATENT DOCUMENTS

| | | |
|---|---|---|
| CN | 1469813 | 1/2004 |
| CN | 1671561 | 9/2005 |
| CN | 1802263 | 7/2006 |
| CN | 1871130 | 11/2006 |
| JP | 2010083034 | 4/2010 |
| JP | 2011230400 | 11/2011 |
| WO | WO-9917873 A1 | 4/1999 |
| WO | WO-03031191 A2 | 4/2003 |
| WO | 2010068193 | 6/2010 |

OTHER PUBLICATIONS

International Search Report dated Jul. 16, 2012 for International application No. PCT/US2011/066117 filed Dec. 20, 2011, Applicant Hewlett-Packard Development Company, L.P. et al.
European Patent Office, extended European search report, Patent Application No. 11877612.9, dated 08JL2015, 7 pages.

* cited by examiner

COATED MEDIA SUBSTRATE

BACKGROUND

As printing technology advances, paper manufacturers are faced with the increasingly rigorous demands of their customers for high quality paper that is economically attractive. For example, there is a great demand for paper of high enough quality to be suitable for printing of a digital image with an inkjet printer where the look and durability of the product approaches that of a laser printer. Thus, there is a keen demand for papers that meet high quality standards with respect to brightness, opacity, and dry and/or wet strength, and that, upon printing with any of a wide range of colorants, provide a water-resistant and vivid printed image. Customers further demand that such papers be amenable to use with a variety of printing techniques, including not only conventional printing techniques, but also "impact free" printing techniques such as inkjet printing (particularly colored inkjet printing), laser printing, photocopying, and the like.

Accordingly, investigations continue into developing paper suitable for various applications, including inkjet printing.

BRIEF DESCRIPTION OF THE DRAWINGS

Additional features and advantages of the present disclosure will be apparent from the detailed description which follows, taken in conjunction with the accompanying drawings, which together illustrate, by way of example, features of the invention.

DETAILED DESCRIPTION

Figure 1:
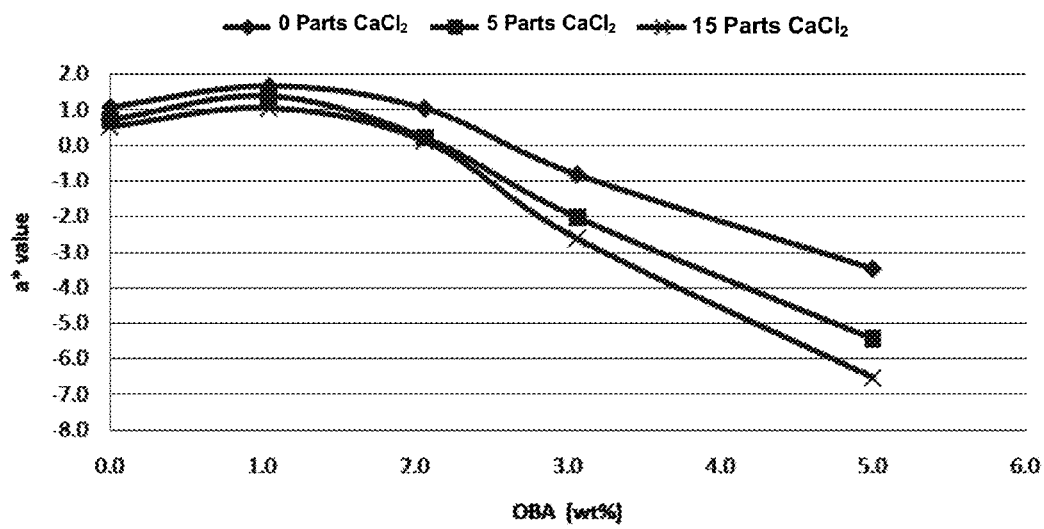
FIG. 1 depicts a graph of a* values vs. wt % of an optical brightening agent of a comparable coated media substrate for comparison with the coated media substrate prepared in accordance with an example of the present disclosure.

Before the present invention is disclosed and described, it is to be understood that this disclosure is not limited to the particular process steps and materials disclosed herein because such process steps and materials may vary.

It is also to be understood that the terminology used herein is used for the purpose of describing particular examples only. The terms are not intended to be limiting because the scope of the present invention is intended to be limited only by the appended claims and equivalents thereof.

It is noted that the singular forms of "a," "an," and "the" include plural referents unless the context clearly dictates otherwise.

As used herein, "liquid vehicle" or "ink vehicle" refers to the liquid fluid in which colorant is placed to form an ink. Ink vehicles are generally known in the art, and a wide variety of ink vehicles may be used with the coated media, systems, and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent. In one aspect, water can comprise a majority of the liquid vehicle.

As used herein, "colorant" can include dyes and/or pigments.

As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble, but not always.

As used herein, "pigment" generally includes pigment colorants, magnetic particles, aluminas, silicas, and/or other ceramics, organo-metallics or other opaque particles, whether or not such particulates impart color. Thus, though in inkjet inks, the present description primarily exemplifies the use of pigment colorants, the term "pigment" can be used more generally to describe not only pigment colorants, but other types of pigments as well. Furthermore, it is noted that the term "pigment" can be used in two different contexts, i.e. pigments in inkjet inks, or alternatively, pigments used as a structural component of a media coating. The context of use will determine which type of pigment is being described.

As used herein, "low-molecular weight polymeric carrier" refers to a polymer having a weighted average molecular weight less than 50,000 Mw.

As used herein, "water-soluble" when referring to an organic acid salt refers to the organic salt being soluble at greater than or equal to 5 wt % in water at room temperature and ambient pressure.

As used herein, "water-dispersible," when referring to an organic salt, refers to the organic salt being soluble of less than 5 wt % in water at room temperature and pressure. The particles of water-dispersible organic acid salt are typically dispersed in aqueous solution.

As used herein, "optical brightener" or "optical brightening agent" refers to dyes that absorb light in the ultraviolet and violet region (usually 340-370 nm) of the electromagnetic spectrum, and re-emit light in the blue region (typically 420-470 nm). These additives are often used to enhance the appearance of color of fabric and paper, causing a "whitening" effect, making materials look less yellow by increasing the overall amount of blue light reflected. This term includes fluorescent brightening agents (FBAs) and fluorescent whitening agents (FWAs).

As used herein, "inkjet" or "inkjetting" refers to compositions that are ejected from jetting architecture, such as inkjet architecture. Inkjet architecture can include thermal or piezo architecture.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

With this in mind, the present disclosure is drawn to the area of coated media substrates, such as for use in inkjet printing. More specifically, the coated media of the present disclosure provides enhanced whiteness and reduced paper greenness while maintaining acceptable optical density of printed images. This improvement is particularly useful for certain inkjet inks, as compounds often used in the inkjet arts that provide acceptable optical density can have detrimental effects on a print media's whiteness. Thus, certain components can be used in ink-receiving layers of coated media substrates that can provide for acceptable optical density while maintaining paper whiteness and reducing paper greenness.

In one example, a coated media substrate for inkjet ink printing can comprise an ink-receiving layer coated on at least one side of a substrate, where the ink-receiving layer is formulated for accepting an inkjet ink composition. The ink-receiving layer can comprise an optical brightening agent, an organic acid salt, a binder, a pigment, and a low-molecular weight polymeric carrier having a weighted average molecular weight less than 50,000 Mw. Additionally, in one aspect, the low-molecular weight polymeric carrier can be capable of forming a hydrogen bond with water.

The present coated media substrates can provide an acceptable CIE whiteness, as defined hereinafter. In one example, the coated media substrate can maintain a CIE whiteness of at least 80% when the optical brightening agent is present over the range of from 1 wt % to 10 wt %. In another aspect, the coated media substrate can maintain a CIE whiteness of at least 90% when the optical brightening agent is present in the ink-receiving layer in an amount of at least 5 wt %. Additionally, the present coated media substrates can provide reduced greenness as measured by a* in the CIELAB color space system, also defined hereinafter. In one example, the coated media substrate can maintain an a* value of more than −5.0 when the optical brightening agent is present over the range of from 1 wt % to 10 wt %. In another example, the coated media substrate can maintain an a* value of more than −5.0 when the optical brightening agent is present in the ink-receiving layer in an amount of at least 5 wt %. Additionally, the present coated media substrates can provide an acceptable optical density when printed therein with an inkjet ink. In one example, the present coated media substrates can provide an optical density within 5% of a comparative coated media substrate when printed with an inkjet ink, e.g., a black inkjet ink. The comparative coated media substrate can include the components of the present coated media substrate except that instead of an organic acid salt, the comparative media substrate includes a non-acid salt, e.g., calcium chloride. In another example, the present coated media substrate can provide an optical density within 1% of the comparative coated media substrate.

Perceived color quality can be quantified using any one of several color space systems, such as CIELAB or Munsell, as is known in the art. With respect to Munsell color space, a given color is defined using three terms, namely Hue, Value, and Chroma. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow). In one example, CIE whiteness can be measured by ISO 11475:1999, "Paper and board—Determination of CIE whiteness, D65/10° (outdoor daylight conditions)" or by ISO 11476:2010 "Paper and board—Determination of CIE whiteness, C/2 degrees (indoor illumination conditions)" published by the International Organization for Standardization.

Generally, the ink-receiving layers of the present coated media substrates can comprise mono- and/or multi-valent organic acid salts including combinations thereof. In one example, the organic acid salt can be a water-soluble organic acid salt. In one aspect, the water-soluble organic acid salt can be a metal salt selected from the group of acetates, propionates, formates, oxalates, and mixtures thereof. In another aspect, the water-soluble organic acid salt can be a di-valent or multi-valent metal salt. In one example, the water-soluble organic acid salt can have the formula $(C_nH_{2n+1}COO^-M^+) \cdot (H_2O)_m$ where n is 1 to 8; M is a metal cation selected from Group I metals, Group II metals, Group III metals, and transitional metals; and m is from 0 to 12. In another aspect, n can be 1 to 4. In still another aspect, M can be selected from the group of sodium, potassium, calcium, copper, nickel, zinc, magnesium, barium, iron, aluminum, and chromium. In one example, the water-soluble organic acid salt can have a pH of 5 to 9 in an aqueous solution at a concentration from 2 to 20wt %.

In addition to the organic acid salt, in one example, the ink-receiving layer can include a water-dispersible organic salt. In one specific example, the water-dispersible organic salt can be selected from the group of citrates, oleates, oxalates, and mixtures thereof.

The ink-receiving layer generally includes an optical brightening agent. In one example, the optical brightening agent can be selected from the group of di-, tetra- or hexa-sulfonated triazine-stilbenes; coumarins; imidazolines; diazoles; triazoles; benzoxazolines; biphenyl-stilbenes; derivatives thereof, and mixtures thereof. In one aspect, the optical brightening agent can include a hexa-sulfonated triazine-stilbene.

The ink-receiving layer generally includes a pigment as well. In one example, the pigment can be selected from the group of a titanium oxide pigments, alumina, silica, silicon dioxide, fumed silica, silica gel, magnesium oxide, calcined clay, delaminated clay, zeolite, laponite clay, calcium carbonate, precipitated calcium carbonate, ground calcium carbonate, and mixtures thereof. In another example, the ink-receiving layer can include at least two pigments. In one aspect, the pigments can include delaminated clay and calcined clay.

Generally, the ink-receiving layer also includes a low-molecular weight polymeric carrier. In one example, the polymeric carrier can be a poly hydro-carbon compound with polar functional groups. In aspect, the polymeric carrier can by a polyvinyl alcohol (PVA). Such PVAs can include Mowiol® 3-98, 4-98, 6-98, and mixtures thereof. Generally, the low-molecular weight polymeric carrier can have a weight average molecule weight less 50,000 Mw. However, in one aspect, the low-molecular weight polymeric carrier can have a weight average molecule weight less 40,000 Mw; and in another aspect, the low-molecular weight polymeric carrier can have a weight average molecule weight less 30,000 Mw.

Additionally, the ink-receiving layer can generally include a binder. Such binders can include latexes or other polymer. In one example, binder can be an acrylate or methacrylate latex. Other binders that can be used include, but are not limited to, vinyl acetate latex, vinyl versatate latex copolymer, polyesters, vinylidene chloride latex and styrene-butadiene or acrylonitrile-butadiene copolymer latex.

As discussed herein, the ink-receiving layer can be coated on a substrate. Such substrates can include any base material that can be coated in accordance with examples of the present disclosures, such as plain paper, rawbase, precoated paper, polymer substrates, film substrates, photobase substrates, and the like.

Regarding the components of the ink-receiving layer, such components can be present such that the whiteness, reduced greenness, and optical density as discussed herein are achieved. As such, the present disclosure can provide for various combinations of ingredients. In one example, the optical brightening agent can be present in the ink-receiving layer from 1 to 10 wt %. In another example, the organic acid salt can be present in the ink-receiving layer from 2 to 20 wt %. In still another example, the binder can be present in the ink-receiving layer from 3 to 25 wt %. In yet another example, the pigment can be present in the ink-receiving layer from 30 to 90 wt %. In still yet another example, the low-molecular weight polymeric carrier can be present in the ink-receiving layer from 1 to 30 wt %.

Additionally, the ratios of the various components of the ink-receiving layer can be adjusted to provide the benefits discussed herein. In one example, the water-soluble organic acid salt and the water-dispersible organic salt can be present at a ratio of water-soluble organic salt to water-dispersible organic salt ranging from 9:1 to 1:1. In another example, the optical brightening agent and polymeric carrier can be present at a ratio of optical brightening agent to polymeric carrier ranging from 1:1 to 1:3. In still another example, the ink-receiving layer can have a pigment to binder ratio ranging from 100:1 to 2:1.

In addition to the above, a method of making a coated media substrate for inkjet printing can comprising applying an ink-receiving layer on at least one side of a substrate, and in some examples, on both sides of the substrate. The ink-receiving layer can be any of those as described herein, and can be applied to the substrate by any method know in the art, such as a liquid or slurry application by roll-coating, conventional slot-die processing, blade coating, bent-blade coating, rod coating, shear-roll coating, reverse-roll coating, slot-die cascade coating, pond coating, curtain coating, air-knife coating, gravure coating, size-pressing coating, brushing coating, and/or other comparable methods, including those that use circulating and non-circulating coating technologies. In some examples, spray-coating, immersion-coating, and/or cast-coating techniques may be used. In one example, the ink-receiving layer can be applied to a coating weight of 1 $g/m^2$ to 30 $g/m^2$. In one aspect, the ink-receiving layer can be applied to a coating weight of 5 $g/m^2$ to 20 $g/m^2$.

Additionally, the ink-receiving layer can be dried, e.g., using infrared heating or heated air or a combination thereof. Other conventional drying methods and equipment can also be used as known in the art. Additionally, after drying, in one example, the coated media substrates can be passed between a pair of rollers, as part of a calendering process. The calendering device can be a separate super-calendering machine, an on-line, soft-nip calendering machine, an off-line, soft-nip calendering machine, or the like.

In addition to the compositions and methods discussed herein, a system for inkjet printing can comprise an inkjet printer having an inkjet ink loaded therein; and a coated media substrate. The coated media substrate can comprise an ink-receiving layer coated on at least one side of a substrate formulated for accepting an inkjet ink composition. The ink-receiving layer can be any of those as described herein.

Regarding the inkjet ink of the system, the ink can include a colorant in an ink vehicle. Generally, the colorant can include pigments and/or dyes. In one example, the inkjet ink includes a pigment that imparts color. Generally, the ink vehicles can comprise a solvent system and may further include a surfactant. In one example, the ink vehicle can be an aqueous ink vehicle. In one aspect, the inks can include resins including acrylic resins. Additional resins may also be used in conjunction with the inks.

As mentioned herein, the coated media substrates of the present disclosure can be prepared and matched with an inkjet ink such that the optical density remains acceptable. In one example, the coated media substrates can provide an optical density within 5% (or 1% in one example) of a comparative coated media substrate when printed with an inkjet ink, e.g., a black inkjet ink. The comparative coated media substrates can include the components of the coated media substrates of the present disclosure, except that instead of an organic acid salt, the comparative media substrates include a non-acid salt, e.g., calcium chloride.

General ink vehicle formulations can include one or more solvent or co-solvents, present in total at from 5 wt % to 50 wt %, and one or more non-ionic, cationic, and/or anionic surfactant, present from 0.01 wt % to 10 wt %. The balance of the formulation can be purified water, or other vehicle components. Classes of solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1-6-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Additionally, various other additives may be employed to optimize the properties of the inks for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the ink. From 0.001 wt % to 2.0 wt %, for example, can be used. Viscosity modifiers and buffers may also be present, as well as other additives known to those skilled in the art to modify properties of the ink as desired. Such additives can be present at from 0.01 wt % to 20 wt %.

EXAMPLES

The following illustrate examples of the disclosure. However, it is to be understood that these examples are merely exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements.

Example 1

Coated Media Substrates 15 coatings were applied to 90 gsm plain raw base paper using a Mayer rod to a coating weight of 10 g/m² (gsm). The 15 coatings corresponded to media coatings having no organic acid salt with various optical brightening agent (OBA) percents, i.e., 0 wt % (control), about 1 wt %, about 2 wt %, about 3 wt %, and about 5 wt %; media coatings having about 5 wt % organic acid salt with various optical brightening agent (OBA) percents, i.e., 0 wt % (control), about 1 wt %, about 2 wt %, about 3 wt %, and about 5 wt %; and media coatings having about 15 wt % organic acid salt with various optical brightening agent (OBA) percents, i.e., 0 wt % (control), 1 about wt %, 2 about wt %, 3 about wt %, and about 5 wt %. The coatings are outlined in Tables 1-3 corresponding to 0 wt % organic acid salt, about 5 wt % organic acid salt, and about 15 wt % organic acid salt, respectively.

TABLE 1

| Component | Control (wt %) | Coated Media Substrate #1a (wt %) | Coated Media Substrate #1b (wt %) | Coated Media Substrate #1c (wt %) | Coated Media Substrate #1d (wt %) |
|---|---|---|---|---|---|
| PVA (Mowiol ® 4-98 from Kuraray America, Inc.) | 7.32 | 7.24 | 7.17 | 7.09 | 6.95 |
| Defoamer (Foamaster ® VF from Cognis) | 0.09 | 0.09 | 0.09 | 0.09 | 0.09 |
| Delaminated clay (Nuclay ® from BASF) | 63.23 | 62.58 | 61.93 | 61.30 | 60.07 |
| Calcined clay (Ansilex ® 93 from BASF) | 27.10 | 26.82 | 26.54 | 26.27 | 25.75 |
| Binder (Acronal ® S728 from BASF) | 2.26 | 2.23 | 2.21 | 2.19 | 2.15 |
| Organic Acid Salt (calcium acetate) | 0 | 0 | 0 | 0 | 0 |
| OBA (Tinopal ® ABP-A from BASF) | 0 | 1.04 | 2.06 | 3.06 | 5.00 |

TABLE 2

| Component | Control (wt %) | Coated Media Substrate #2a (wt %) | Coated Media Substrate #2b (wt %) | Coated Media Substrate #2c (wt %) | Coated Media Substrate #2d (wt %) |
|---|---|---|---|---|---|
| PVA (Mowiol ® 4-98 from Kuraray America, Inc.) | 6.93 | 6.86 | 6.79 | 6.72 | 6.59 |
| Defoamer (Foamaster ® VF from Cognis) | 0.09 | 0.08 | 0.08 | 0.08 | 0.08 |
| Delaminated clay (Nuclay ® from BASF) | 59.91 | 59.28 | 58.67 | 58.07 | 56.91 |
| Calcined clay (Ansilex ® 93 from BASF) | 25.67 | 25.41 | 25.14 | 24.89 | 24.39 |
| Binder (Acronal ® S728 from BASF) | 2.14 | 2.12 | 2.10 | 2.07 | 2.03 |
| Organic Acid Salt (calcium acetate) | 5.26 | 5.21 | 5.15 | 5.1 | 5.00 |
| OBA (Tinopal ® ABP-A from BASF) | 0.00 | 1.04 | 2.06 | 3.06 | 5.00 |

TABLE 3

| Component | Control (wt %) | Coated Media Substrate #3a (wt %) | Coated Media Substrate #3b (wt %) | Coated Media Substrate #3c (wt %) | Coated Media Substrate #3d (wt %) |
|---|---|---|---|---|---|
| PVA (Mowiol ® 4-98 from Kuraray America, Inc.) | 6.16 | 6.10 | 6.03 | 5.97 | 5.85 |
| Defoamer (Foamaster ® VF from Cognis) | 0.08 | 0.08 | 0.07 | 0.07 | 0.07 |
| Delaminated clay (Nuclay ® from BASF) | 53.25 | 52.69 | 52.15 | 51.62 | 50.59 |
| Calcined clay (Ansilex ® 93 from BASF) | 22.82 | 22.58 | 22.35 | 22.12 | 21.68 |
| Binder (Acronal ® S728 from BASF) | 1.90 | 1.88 | 1.86 | 1.84 | 1.81 |
| Organic Acid Salt (calcium acetate) | 15.78 | 15.63 | 15.46 | 15.31 | 15.00 |
| OBA (Tinopal ® ABP-A from BASF) | 0.00 | 1.04 | 2.06 | 3.06 | 5.00 |

Example 2

Comparative Coated Media Substrates 15 coatings were applied to 90 gsm plain raw base paper using a Mayer rod to a coating weight of 10 g/m² (gsm). The 15 coatings corresponded to media coatings having no non-acid salt with various optical brightening agent (OBA) percents; i.e., 0 wt % (control), about 1 wt %, about 2 wt %, about 3 wt %, and about 5 wt %; media coatings having about 5 wt % non-acid salt with various optical brightening agent (OBA) percents; i.e., 0 wt % (control), about 1 wt %, about 2 wt %, about 3 wt %, and about 5 wt %; and media coatings having about 15 wt % non-acid salt with various optical brightening agent (OBA) percents; i.e., 0 wt % (control), about 1 wt %, about 2 wt %, about 3 wt %, and about 5 wt %. The coatings are outlined in Tables 4-6 corresponding to 0 wt % non-acid salt, about 5 wt % non-acid salt, and 15 wt % non-acid salt, respectively.

TABLE 4

| Component | Control (wt %) | Coated Media Substrate #4a (wt %) | Coated Media Substrate #4b (wt %) | Coated Media Substrate #4c (wt %) | Coated Media Substrate #4d (wt %) |
|---|---|---|---|---|---|
| PVA (Mowiol® 4-98 from Kuraray America, Inc.) | 7.32 | 7.24 | 7.17 | 7.09 | 6.95 |
| Defoamer (Foamaster® VF from Cognis) | 0.09 | 0.09 | 0.09 | 0.09 | 0.09 |
| Delaminated clay (Nuclay® from BASF) | 63.23 | 62.58 | 61.93 | 61.30 | 60.07 |
| Calcined clay (Ansilex® 93 from BASF) | 27.10 | 26.82 | 26.54 | 26.27 | 25.75 |
| Binder (Acronal® S728 from BASF) | 2.26 | 2.23 | 2.21 | 2.19 | 2.15 |
| Non-acid Salt ($CaCl_2$) | 0 | 0 | 0 | 0 | 0 |
| OBA (Tinopal® ABP-A from BASF) | 0 | 1.04 | 2.06 | 3.06 | 5.00 |

TABLE 5

| Component | Control (wt %) | Coated Media Substrate #5a (wt %) | Coated Media Substrate #5b (wt %) | Coated Media Substrate #5c (wt %) | Coated Media Substrate #5d (wt %) |
|---|---|---|---|---|---|
| PVA (Mowiol® 4-98 from Kuraray America, Inc.) | 6.93 | 6.86 | 6.79 | 6.72 | 6.59 |
| Defoamer (Foamaster® VF from Cognis) | 0.09 | 0.08 | 0.08 | 0.08 | 0.08 |
| Delaminated clay (Nuclay® from BASF) | 59.91 | 59.28 | 58.67 | 58.07 | 56.91 |
| Calcined clay (Ansilex® 93 from BASF) | 25.67 | 25.41 | 25.14 | 24.89 | 24.39 |
| Binder (Acronal® S728 from BASF) | 2.14 | 2.12 | 2.10 | 2.07 | 2.03 |
| Non-acid Salt ($CaCl_2$) | 5.26 | 5.21 | 5.15 | 5.1 | 5.00 |
| OBA (Tinopal® ABP-A from BASF) | 0.00 | 1.04 | 2.06 | 3.06 | 5.00 |

TABLE 6

| Component | Control (wt %) | Coated Media Substrate #6a (wt %) | Coated Media Substrate #6b (wt %) | Coated Media Substrate #6c (wt %) | Coated Media Substrate #6d (wt %) |
|---|---|---|---|---|---|
| PVA (Mowiol® 4-98 from Kuraray America, Inc.) | 6.16 | 6.10 | 6.03 | 5.97 | 5.85 |
| Defoamer (Foamaster® VF from Cognis) | 0.08 | 0.08 | 0.07 | 0.07 | 0.07 |
| Delaminated clay (Nuclay® from BASF) | 53.25 | 52.69 | 52.15 | 51.62 | 50.59 |
| Calcined clay (Ansilex® 93 from BASF) | 22.82 | 22.58 | 22.35 | 22.12 | 21.68 |
| Binder (Acronal® S728 from BASF) | 1.90 | 1.88 | 1.86 | 1.84 | 1.81 |
| Non-acid Salt ($CaCl_2$) | 15.78 | 15.63 | 15.46 | 15.31 | 15.00 |
| OBA (Tinopal® ABP-A from BASF) | 0.00 | 1.04 | 2.06 | 3.06 | 5.00 |

Example 3

Data

Figure 2:
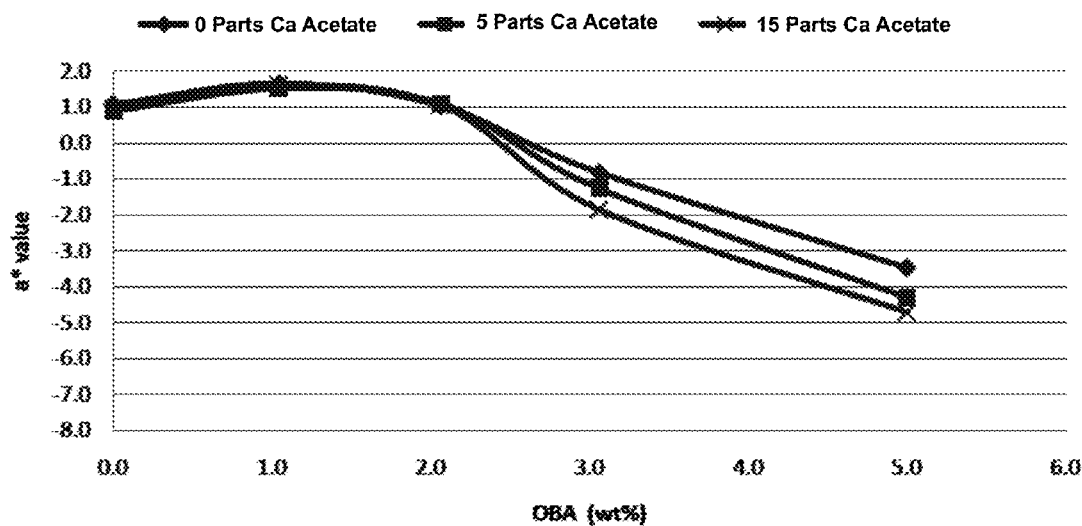
FIG. 2 depicts a graph of a* values vs. wt % of an optical brightening agent of a coated media substrate prepared in accordance with an example of the present disclosure.

The present coated media substrates of Example 1 provided better paper greenness as compared to the comparable media of Example 2. Specifically, FIG. 1 shows a* values of comparable coated media substrates having various levels of non-acid salts for various levels of optical brightening agents (OBAs). FIG. 2 shows a* values of the present coated media having various levels of organic acid salts for various levels of OBAs. Notably, the present coated media showed consistently better paper greenness for each coated media containing OBA as compared to the comparable coated media substrates.

Figure 3:
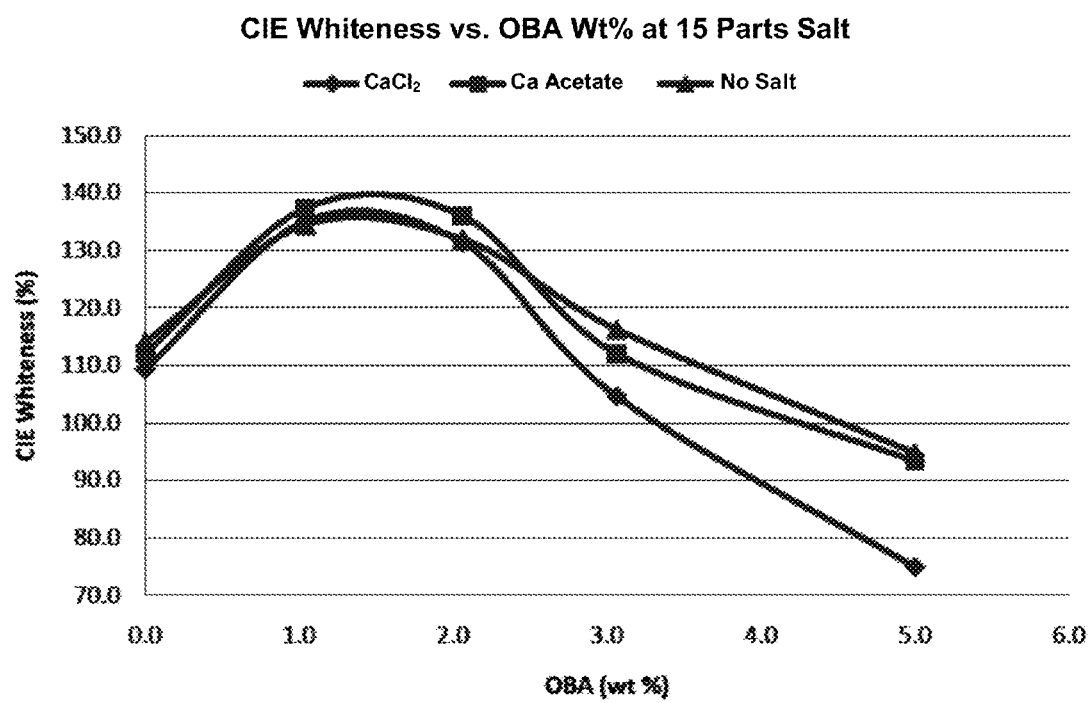
FIG. 3 depicts a graph of % CIE whiteness vs. wt % of optical brightening agents for a coated media substrate and comparable coated media substrate in accordance with an example of the present disclosure

Additionally, FIG. 3 provides a comparison of CIE whiteness of the present coated media substrates (Table 3, control and coated media substrates #3a-d) versus the comparable coated media substrates (Table 6, control and coated media substrates #6a-d). Notably, the present coated media substrates of the present disclosure showed consistently better CIE whiteness for each coated media substrate containing OBA as compared to the comparable coated media substrates.

While the invention has been described with reference to certain examples, those skilled in the art will appreciate that various modifications, changes, omissions, and substitutions can be made without departing from the spirit of the invention. It is intended, therefore, that the invention be limited only by the scope of the following claims.

What is claimed is:

1. A coated media substrate, comprising an ink-receiving layer coated on at least one side of a substrate and formulated for accepting an inkjet ink composition, the ink-receiving layer comprising:
   an optical brightening agent;
   a water soluble organic acid salt;
   a water-dispersible organic salt;
   a binder;
   a pigment; and
   a low-molecular weight polymeric carrier having a weight average molecular weight less than 50,000 Mw.

2. The coated media substrate of claim 1, wherein the water-soluble organic acid salt and the water-dispersible organic salt are present at a weight ratio of water-soluble organic salt to water-dispersible organic salt from 9:1 to 1:1.

3. The coated media substrate of claim 1, wherein the water-soluble organic acid salt is selected from the group of acetates, propionates, formates, oxalates, and mixtures thereof.

4. The coated media substrate of claim 1, wherein the water-dispersible organic salt is selected from the group of citrates, oleates, oxalates, and mixtures thereof.

5. The coated media substrate of claim 1, wherein the ink-receiving layer has an optical brightening agent to polymeric carrier weight ratio from 1:1 to 1:3.

6. The coated media substrate of claim 1, wherein the ink-receiving layer has a pigment to binder weight ratio from 100:1 to 2:1.

7. The coated media substrate of claim 1, wherein the optical brightening agent is selected from the group of di-, tetra- or hexa-sulfonated triazinestilbenes; coumarins; imidazo lines; diazo les; triazo les; benzoxazo lines; biphenylstilbenes; derivatives thereof; and mixtures thereof.

8. The coated media substrate of claim 1, wherein the pigment is selected from the group of titanium oxide pigments, alumina, silica, magnesium oxide, calcined clay, delaminated clay, calcium carbonate, precipitated calcium carbonate, ground calcium carbonate and mixtures thereof.

9. The coated media substrate of claim 1, wherein the polymeric carrier is poly hydro-carbon compound with polar functional groups.

10. The coated media substrate of claim 1, wherein the coated media substrate maintains an a* value of more than −5.0 when the optical brightening agent is present over the range of 1 wt % to 10 wt %.

11. The coated media substrate of claim 1, wherein the coated media substrate maintains a CIE whiteness of at least 80% when the optical brightening agent is present over the range of 1 wt % to 10 wt %.

12. The coated media substrate of claim 1, wherein the low-molecular weight polymeric carrier is capable of forming a hydrogen bond with water.

13. A method of making a coated media substrate, comprising:

applying a coating composition on at least one side of a substrate at a coating weight from 1 g/m$^2$ to 30 g/m$^2$, the ink-receiving layer comprising an optical brightening agent, a water soluble organic acid salt, a water-dispersible organic salt, a binder, a pigment, and a low-molecular weight polymeric carrier having a weighted average molecular weight less than 50,000 Mw; and drying the coating composition on the substrate to form an ink-receiving layer on the substrate.

14. A system for inkjet printing, comprising:

an inkjet printer having an inkjet ink loaded therein; and a coated media substrate comprising an ink-receiving layer applied to at least one side of a substrate formulated for accepting an inkjet ink composition, the ink-receiving layer comprising an optical brightening agent, a water soluble organic acid salt, a water-dispersible organic salt, a binder, a pigment, and a low-molecular weight polymeric carrier having a weighted average molecular weight less than 50,000 Mw, wherein the low-molecular weight polymeric carrier is capable of forming a hydrogen bond with water.

15. The system of claim 14, wherein the coated media substrate provides an optical density within 5% of a comparative coated media substrate when printed with the inkjet ink, the comparative coated media substrate prepared identically to the coated media substrate except that the organic acid salt is replaced with calcium chloride, and wherein the coated media substrate has reduced paper greenness and improved CIE whiteness compared to the comparative coated media substrate.

16. The coated media substrate of claim 1, wherein the coated media substrate maintains an a* value of more than −5.0 when the optical brightening agent is present over the range of 0 wt % to 5 wt % and when the organic acid salt is present over the range of 0 wt % to 15 wt %.

17. The coated media substrate of claim 1, wherein the pigment comprises calcined clay and delaminated clay.

\* \* \* \* \*

UNITED STATES PATENT AND TRADEMARK OFFICE
CERTIFICATE OF CORRECTION

PATENT NO. : 9,505,256 B2  
APPLICATION NO. : 14/366197  
DATED : November 29, 2016  
INVENTOR(S) : Lokendra Pal et al.

Page 1 of 1

It is certified that error appears in the above-identified patent and that said Letters Patent is hereby corrected as shown below:

In the Claims

In Column 11, Lines 16-17 approx., in Claim 7, delete "imidazo lines" and insert -- imidazolines --, therefor.

In Column 11, Line 17 approx., in Claim 7, delete "diazo les" and insert -- diazoles --, therefor.

In Column 11, Line 17 approx., in Claim 7, delete "triazo les" and insert -- triazoles --, therefor.

In Column 11, Line 17 approx., in Claim 7, delete "benzoxazo lines" and insert -- benzoxazolines --, therefor.

Signed and Sealed this
Twenty-eighth Day of March, 2017

Michelle K. Lee
*Director of the United States Patent and Trademark Office*